United States Patent
Makino et al.

(10) Patent No.: US 6,857,125 B2
(45) Date of Patent: Feb. 15, 2005

(54) CONTACT MEMBER TO OPTICAL DISK, PROTECTING FILM FOR OPTICAL DISK AND COATING COMPOSITION

(75) Inventors: Shin Makino, Atsugi (JP); Yukinobu Nomura, Atsugi (JP); Sadatoshi Inagaki, Mie (JP); Satoru Fukuzawa, Mie (JP)

(73) Assignees: Akros Limited, Kanagawa (JP); NTN Corporation, Osaka (JP)

( * ) Notice: Subject to any disclaimer, the term of this patent is extended or adjusted under 35 U.S.C. 154(b) by 227 days.

(21) Appl. No.: 10/306,525

(22) Filed: Nov. 27, 2002

(65) Prior Publication Data

US 2003/0107973 A1 Jun. 12, 2003

(30) Foreign Application Priority Data

Dec. 10, 2001 (JP) .................................... P2001-376121

(51) Int. Cl.$^7$ .............................. G11B 7/00; G11B 7/12
(52) U.S. Cl. .................................... 720/671; 369/112.23
(58) Field of Search ................................ 720/648, 671; 369/75.1, 75.2, 77.1, 77.2, 244, 247, 300, 112.23; 359/871

(56) References Cited

U.S. PATENT DOCUMENTS

2001/0019534 A1 * 9/2001 Mohri et al. ................ 369/247
2002/0060974 A1 * 5/2002 Murata et al. ......... 369/112.23

FOREIGN PATENT DOCUMENTS

| JP | 63-205168 | 8/1988 |
| JP | 04-095566 | 4/1992 |
| JP | 10-118334 | 4/1998 |
| JP | 11-042408 | 2/1999 |

* cited by examiner

Primary Examiner—David Ometz
(74) Attorney, Agent, or Firm—Hedman & Costigan, P.C.

(57) ABSTRACT

A coating comprising a urethane resin as a base, and at least polyurethane particles and fluororesin powder is formed on a surface of a member that is, or can be, contacted with an optical disk in an optical disk apparatus. The coating can prevent the optical disk, i.e., a CD, a DVD, etc., from damaging, even if the optical disk is contacted with a tray or an objective lens.

18 Claims, 6 Drawing Sheets

CONTACT MEMBER TO OPTICAL DISK, PROTECTING FILM FOR OPTICAL DISK AND COATING COMPOSITION

BACKGROUND OF THE INVENTION

The present invention relates to a contact member including a coating formed on a portion that is, or can be, contacted with an optical disk in an optical disk apparatus for reading and recording the optical disk, a protecting film for the optical disk and a coating composition that can form the film.

In recent years, various types of optical disks have been developed. Two types are widely known. One type is that the optical disk itself is inserted into the optical disk apparatus such as a CD, a DVD and the like. The other type is that the optical disk contained in a case is inserted into the optical disk apparatus such as an MO, an MD, a DVD-RAM and the like.

The former type that the optical disk itself is inserted into the optical disk apparatus has a problem that a recording surface of the optical disk such as the CD and the DVD may be abraded and damaged at a disk insertion. When the optical disk is impacted accidentally during the CD or DVD reading or recording, an objective lens or the recording surface of the optical disk may be damaged.

The optical disk apparatus having a property to collect light using the same lens as to the CD and the DVD has a problem that the objective lens collides with the optical disk due to a difference in a working distance. The objective lens or the recording surface of the optical disk may be damaged.

A helium neon laser that can record more information has been developed instead of the conventional semiconductor laser. The use of the helium neon laser makes the space between the objective lens and the optical disk very narrow. Accordingly, the objective lens collides with the optical disk depending on accuracy of the optical disk itself, or due to deflection upon operation of the optical disk. The objective lens or the recording surface of the optical disk may be damaged.

Various attempts have been made to solve the above-mentioned problem that the objective lens or the recording surface of the optical disk may be damaged in the optical disk apparatus. For example, Japanese Patent Laid-Open Application No. 2-54433 describes that a pick-up actuator moving part nearest to the optical disk is made with a softer material than that of the optical disk. Japanese Patent Laid-Open Application No. 11-312322 describes that a silicone rubber protector is applied around the objective lens. Japanese Patent No. 2593998 describes that a cushioning material such as a sheep felt and the like are applied around the objective lens. Japanese Patent Laid-Open Application No. 2000-242958 describes that an elastic body, i.e., rubber is applied to the objective lens itself.

However, in the DVD and the optical disk using the helium neon laser, the damaged recording surface of the optical disk or the damaged objective lens may adversely affect reading properties of the optical disk than ever before. For example, even though a tray and the disk insertion of the optical disk apparatus are made of a polyacetal resin that is softer material than that of the optical disk, it is difficult to completely prevent scratches that may adversely affect the reading properties of the recording surface of the optical disk.

The cushioning material such as the polyacetal resin, the rubber and the felt suffer from significant creep or elastic deformation. It is therefore difficult to completely prevent the collision of the objective lens and the optical disk.

SUMMARY OF THE INVENTION

An object of the present invention is to provide a contact member including a coating formed on a portion that is, or can be, contacted with an optical disk in an optical disk apparatus, a protecting film for the optical disk and a coating composition that can form the film, in which the coating can prevent the optical disk, i.e., a CD, a DVD and the like, from damaging, even if the optical disk is contacted with a tray or an objective lens.

A contact member according to the present invention is a member that is, or can be, contacted with an optical disk in an optical disk apparatus, comprises a portion that is, or can be, contacted with the optical disk, and a coating formed on a surface of the portion, wherein the coating comprises a urethane resin as a base, and at least polyurethane particles, and fluororesin powder.

A protecting film for an optical disk formed on a portion that is, or can be, contacted with an optical disk in an optical disk apparatus to protect the optical disk from damaging, comprises a urethane resin base, and at least polyurethane particles, and fluororesin powder.

A coating composition for an optical disk formed on a portion that is, or can be, contacted with an optical disk in an optical disk apparatus to protect the optical disk from damaging, comprises a urethane resin base, and at least polyurethane particles, and fluororesin powder.

The portion that is, or can be, contacted with an optical disk is, or can be, directly contacted with a data reading surface of the optical disk is at least one selected from a disk tray, a disk insertion, an objective lens and a holding member of the objective lens.

In order to prevent scratches on the recording surface of the optical disk, the portion that is contacted with the optical disk is coated with a coating film having excellent lubricity to relax the attack to the optical disk utilizing its slidability. For example, fluororesin may be compounded or diffused in the coating film. However, experiments prove that such a coating film cannot prevent the scratches on the optical disk rotated at high speed. According to the present invention, the coating film comprising the urethane resin as a base, and at least the polyurethane particles and the fluororesin powder is formed on the portion that is contacted with the optical disk. It is found that excellent slidability and elastic deformation of the coating film relax the collision or friction to the optical disk, resulting in the contact member to the optical disk that does not produce scratches. The present invention is based on such discovery.

DETAILED DESCRIPTION OF THE PREFERRED EMBODIMENTS

The polyurethane resin used as a component for forming the coating film, i.e., the base resin, or a binder for the coating, according to the present invention, include a crosslinked urethane resin obtained by preparing one or more of a polyol component and polyisocyanate component. The polyol components include polyol such as polyester polyol resin, polyether polyol resin, acrylic polyol resin, copolymer of fluoroolefin containing a hydroxyl group and alkylvinylether(FEVE), polytetramethylene ether glycol (PTMG), diols, or a thermoplastic urethane resin. The polyisocyanate components include tolylenediisocyanate(TDI), diphenylmethanediisocyanate(MDI), 1,5-naphthalenediisocyanate (NDI), tolidineisocyanate (TODI), hexamethylenediisocyanate(HDI), isophoronediisocyanate (IPDI), 2,2,4-trimethylhexamethylenediisocyanate(TMDI), xylylenediisocyanate(XDI), dicylcohexylmethanediisocyanate (H-MDI), an adduct product prepared by the polyisocyanate components and a polyol such as trimethylol propane, and a block isocyanate type in which an isocyanate group is blocked with a blocking agent such as phenols, lactams, alcohols, and oximes.

The polyurethane resins also include moisture curing type urethane resin, oil modified urethane resin, lacquer type urethane resin, thermoplastic urethane resin and ultraviolet curing type urethane resin.

Examples of the polyester polyol resin include Takelac U-25, U-27, U-53, and U-502 manufactured by Takeda Chemical Industries, Ltd.; NIPPOLLAN1100, 192, 3023, 131, 4009, 4070, and 5019 manufactured by Nippon Polyurethane Industry Co., Ltd.; and Desmophen 670, 1652, and C200 manufactured by Sumika Bayer Urethane Co., Ltd.

Specific examples of the polyether polyol resin include Takelac E-550, E-551, and E-551T manufactured by Takeda Chemical Industries, Ltd.; and Desmophen 250U, 1900U, and 1920U manufactured by Sumika Bayer Urethane Co., Ltd.

Examples of the acrylic polyol resin include Takelac UA-902, US-905, and UA-906 manufactured by Takeda Chemical Industries, Ltd.; Desmophen A365BA, and A665BA manufactured by Sumika Bayer Urethane Co., Ltd., and ACRYDIC FU-409 manufactured by Dainippon Ink and Chemicals, Incorporated.

Examples of the copolymer fluoroolefin containing a hydroxyl group and alkylvinylether (FEVE) include LUMIFLON LF-600, LF-601, and FE-3000 manufactured by Asahi Glass Co., Ltd.

Examples of the polytetramethylene ether glycol (PTMG) include PTG-1000, and PTG-2000 manufactured by Hodogaya Chemical Co., Ltd. and PTMG-1000, and PTMG-2000 manufactured by Mitsubishi Chemical Corporation.

Examples of the thermoplastic urethane resin include NIPPOLLAN 5025, 5033, 5037, 5109, 5110, 5115, 5120, 5137, 5196, and 5230 manufactured by Nippon Polyurethane Industry Co., Ltd.

Examples of the polyisocyanates include Takenate D-102, D-103, D-103H, D-103M2, D-104, D-202, D-204, D-212, D-215, D-217, D-110N, D-120N, D-140N, D-160N, D-170N, and D-181N manufactured by Takeda Chemical Industries, Ltd.; CORONATE L, HK, HL, and HX manufactured by Nippon Polyurethane Industry Co., Ltd.; DURANATE 24A-100, TPA-100, 21S-75E, MFA-90X, E405-80T, TSE-100, TSA-100 manufactured by Asahi Chemical Industry Co., Ltd., and Sumidur N-75, N-3200, N-3300, E-4280, and VPLS2010 manufactured by Sumika Bayer Urethane Co., Ltd.

Examples of the block isocyanate include Takenate B-800, B-830, B-832, B-815N, B-842N, B-846N, and B-870N manufactured by Takeda Chemical Industries, Ltd.; CORONATE 2503, 2512, 2507, 2513, 2515, and 2527 manufactured by Nippon Polyurethane Industry Co., Ltd.; DURANATE E405-B80T, and MF-B60X manufactured by Asahi Chemical Industry Co., Ltd., Desmodur BL3175, and BL1265MPA manufactured by Sumika Bayer Urethane Co., Ltd., and BURNOCK DN-980, and DN-955 manufactured by Dainippon Ink and Chemicals, Incorporated.

Examples of the moisture curing type urethane resin include CORONATE 2234 and 2298 manufactured by Nippon Polyurethane Industry Co., Ltd. Specific examples of the lacquer type urethane resin include Desmolac 2100, and 4125T manufactured by Sumika Bayer Urethane Co., Ltd.

Among them, the polyurethane resin and the thermoplastic urethane resin where polyol (poly hydroxyl group) and polyisocyanate(polyisocyanate group) are crosslinked are preferable, which can form the coating having excellent flexibility, abrasion resistance, and adhesiveness. The urethane bond is prepared by addition reaction of the hydroxyl group and the isocyanate group. Among the above-mentioned polyols, polyester polyol having excellent flexibility, abrasion resistance and adhesiveness and polyether polyol having excellent flexibility and water resistance are especially preferable. Although acrylic polyol, and the copolymer of fluoroolefin containing a hydroxyl group and alkylvinylether (FEVE) are relatively hard, polyol and diol that can add flexibility such as the polytetramethylene ether glycol (PTMG) are blended therewith, or a flexible material is used for the polyisocyanate which is a crosslinking agent, whereby the coating film can be flexible, and such acrylic polyol and the copolymer can be preferably used. The latter is preferable in that it has especially high molecular weight, excellent flexibility and abrasion resistance.

On the other hand, polyisocyanate is selected taking reactivity and flexibility into consideration. The coating composition for use in the present invention may be one part or two parts.

The mixing equivalent ratio of the compound including the hydroxyl group to the compound including the isocyanate (hydroxyl group/isocyanate group) is preferably 0.5 to 2.0, more preferably 0.7 to 1.5. If the equivalent ratio is less than 0.5, the coating film becomes hard and brittle. If the ratio exceeds 2.0, non-reacted functional groups remain, and the coating film has decreased properties such as poor water resistance.

The urethane resin used as the component for forming the coating film, i.e., the base resin, or the binder for the coating is preferably polyurethane resin having excellent elasticity to provide the flexible coating film. Elasticity can be measured by elongation at break in a tensile test in accordance with JIS K 7127. The coating film obtained by the resin alone has elongation at tensile break of 50 to 1000%, preferably 100 to 1000%. If the elongation is less than 50%, the polyurethane resin has decreased elasticity to decrease the protecting properties. If the elongation exceeds 1000%, the coating film has decreased strength.

The polyurethane particles for use in the present invention are elastic powder of the polyurethane resin. Its shape is not limited to sphere, and may be deformed by milling.

The polyurethane particles are blended in the coating film, and the elastic particles partially protrude on the surface of the coating film. Accordingly, the elasticity of the elastic particles and the decreased contact area due to the protrusion can prevent the attacks to the optical disk, even if the contact member is contacted with the optical disk.

The polyurethane particles have preferably a mean particle size of 150 μm or less, more preferably 5 to 50 μm. If the particle size is too large, the particles are easily fallen from the coating film, resulting in shortened the scratch resistance duration.

It is preferable that the amount of the polyurethane particles are 20 to 150 parts by weight based on 100 parts by weight of the resin components of the coating film or the coating material. If the amount is less than 20 parts by weight, the scratch resistance may not be provided. If the amount exceeds 150 parts by weight, the adhesiveness with the substrate or the friction and abrasion resistance may be decreased.

Specific examples of the polyurethane particles include BURNOCK CFB series, for example, BURNOCK CFB100, manufactured by Dainippon Ink and Chemicals, Incorporated.

The fluororesin powder for use in the present invention is resin powder containing fluorine. Examples include polytetrafluoroethylene (PTFE), tetrafluoroethylene-perfluoroalkyl vinyl ether copolymer (PFA), tetrafluoroethylene-hexafluoropropylene copolymer (FEP), ethylene-tetrafluoroethylene copolymer (ETFE), tetrafluoroethylene-fluoroalkyl vinyl ether-fluoroolefin copolymer (EPE), polychlorotrifluoroethylene (PCTFE), ethylene-chlorotrifluoroethylene copolymer (ECTFE), polyvinylidene fluoride (PVDF), and polyvinyl fluoride (PVF).

Among them, the PTFE powder is preferable since it has the best abrasion resistance and is available with low costs.

The PTFE powder for use in the present invention is a polymer having a repeating unit —$CF_2CF_2$—, and has very low friction factor. The powder slides well to decrease the friction upon contact with the optical disk, thereby improving the scratch resistance.

The PTFE powder has preferably a mean particle size of 50 μm or less, more preferably 20 μm or less. If the mean particle size exceeds 50 μm, the scratch resistance duration may be shortened.

It is preferable that the amount of the fluororesin powder be 10 to 150 parts by weight based on 100 parts by weight of the resin components of the coating film or the coating material. If the amount is less than 10 parts by weight, friction reducing effect may not be provided. If the amount exceeds 150 parts by weight, the adhesiveness with the substrate, cohesion of the coating may be decreased so that the friction and abrasion resistance may not be provided. Specific examples of the PTFE powder include Lubron L-2, and Lubron L-5 manufactured by Daikin Industries, Ltd., Fluon L155J and Fluon L170J manufactured by Asahi Glass Co., Ltd., Dainion TF9202, TF9205, and TF9207 manufactured by Sumitomo 3M Limited, and KTL-8F, and KTL-610 manufactured by Kitamura Limited.

The protecting, i.e., scratch resistant coating film according to the present invention is obtained by coating and crosslinking a film of mixing and diffusing the polyurethane particles and the fluororesin powder into the base urethane resin, or by producing the layer of the coating film and adhering it to the substrate with an adhesive. The adhesive can be an organic resin based adhesive such as an epoxy resin adhesive and a urethane resin adhesive. Upon adhesion, a primer treatment or a colona discharge treatment for activating the surface can be applied, as required.

As film forming conditions upon crosslinking or layer producing, optimum curing conditions for the selected resin are selected.

The protecting, i.e., scratch resistant coating composition according to the present invention can be generally obtained by dissolving or dispersing the urethane resin in a solvent, depending on a coating method and a coating thickness, and mixing and diffusing the dissolved or dispersed resin with the polyurethane particles and fluororesin powder. The scratch resistant coating composition can be mixed using three rolls, beads mill, atriter, ball mill, high speed impeller and the like.

The coating composition can be coated with a spray, a brush and the like. After the substrate is coated with the coating composition, the coating composition is cured under the optimum coating film-forming conditions of the resin selected for the urethane resin.

The coating formed on the substrate preferably has a thickness of 5 to 300 μm, more preferably 10 to 150 μm. If the thickness of the coating is less than 5 μm, the elastic particle powder is easily fallen, and not only the abrasion resistance but also the sliding durability may be decreased. If the thickness of the coating exceeds 150 μm, the coating film is too sheared to decrease the durability.

Figure 1:
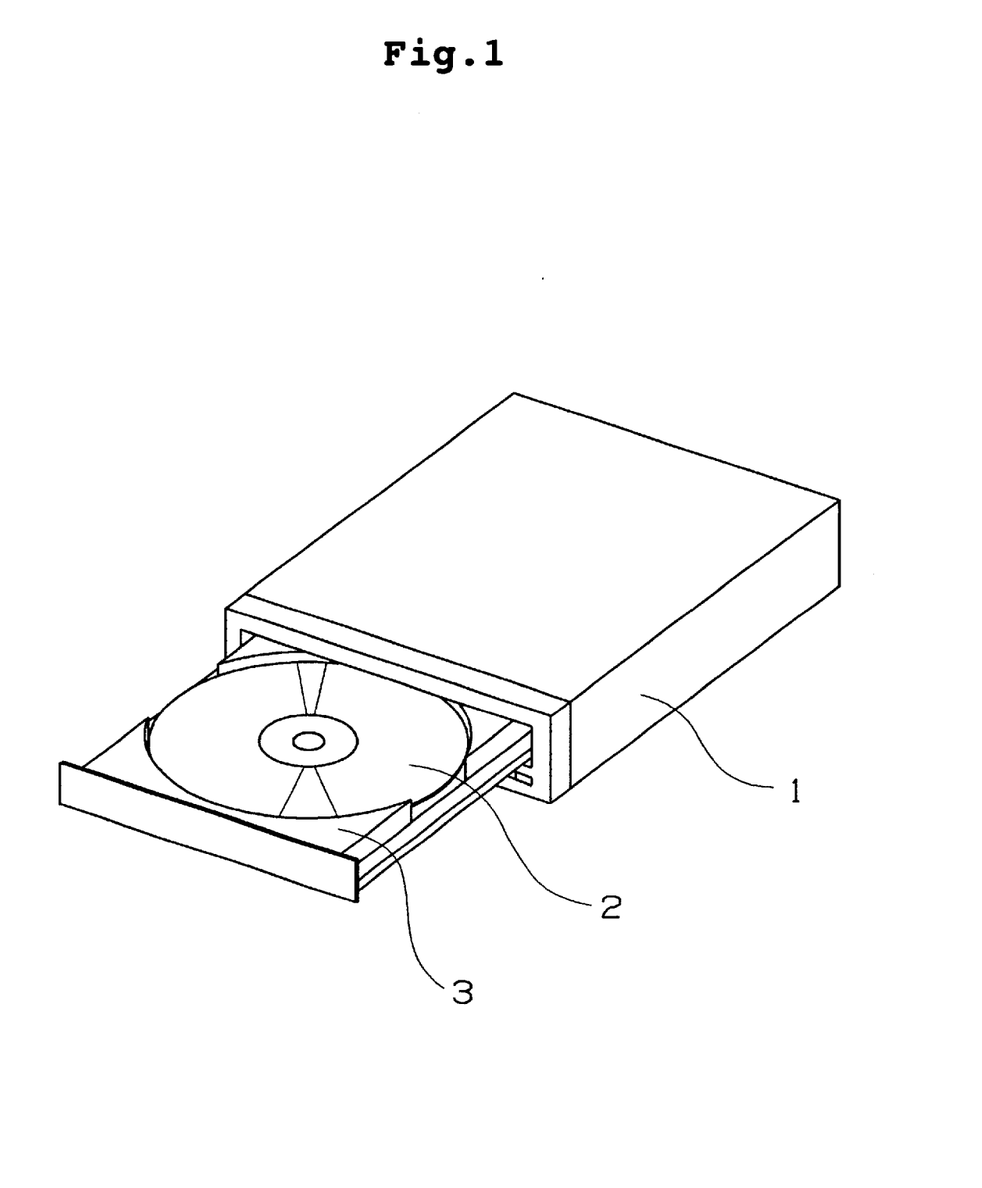
FIG. 1 is a perspective view of a tray type optical disk apparatus.
Figure 2:
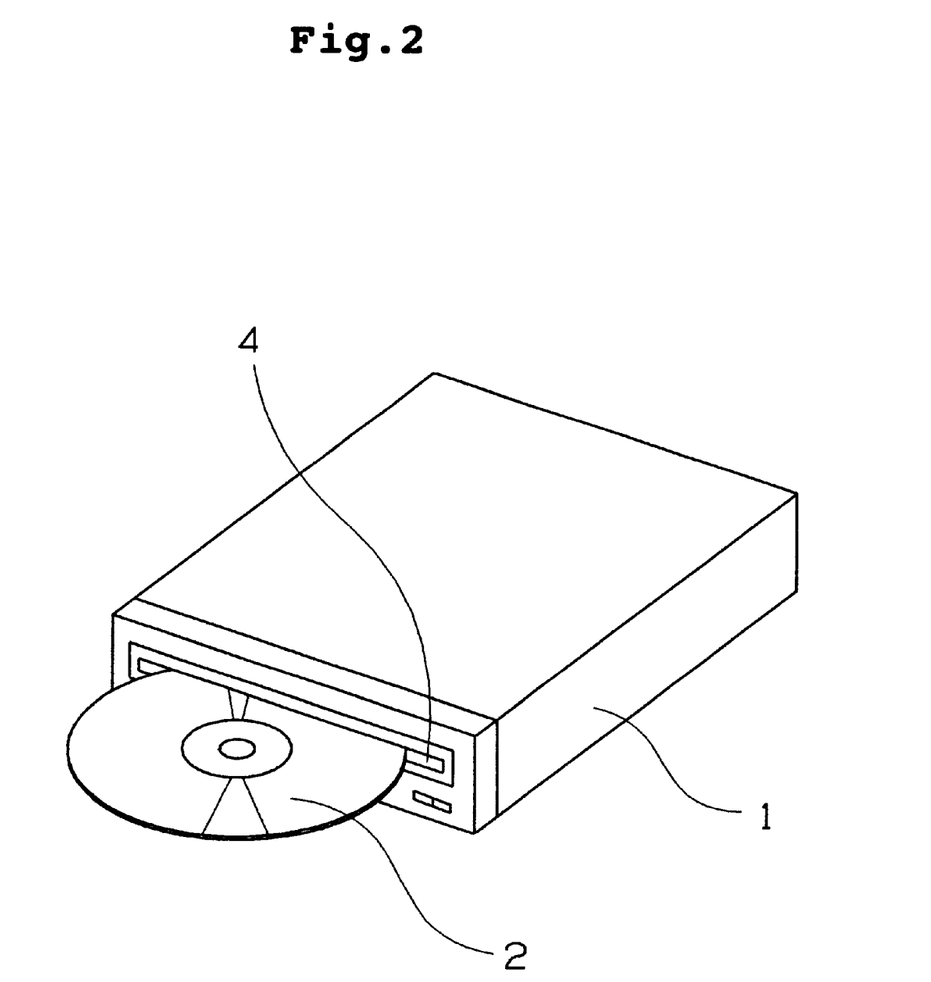
FIG. 2 is a perspective view of a slot-in type optical disk apparatus.

Referring to Figures, the portion including the above-described coating that is, or can be, contacted with the optical disk in the optical disk apparatus will be described. FIG. 1 is a perspective view of a tray type optical disk apparatus. FIG. 2 is a perspective view of a slot-in type optical disk apparatus.

In a tray type optical disk apparatus 1 shown in FIG. 1, an optical disk 2 is mounted on a tray 3, and is accommodated within the apparatus together with the tray 3. On the other hand, in a slot-in type optical disk apparatus 1 shown in FIG. 2, the optical disk 2 is directly accommodated within the apparatus from a disk insertion 4. In either case, a data reading surface of the optical disk 2 is directly contacted with a part of the optical apparatus 1 when the optical disk 2 is accommodated within the apparatus. Or, a portion of the optical disk 2 can be contacted with the apparatus, when the optical disk moves or rotates. The above-described coating is disposed on the portion that is, or can be, contacted with the optical disk, especially on the portion that is, or can be, contacted with the data reading surface of the optical disk.

Any types of materials can be used for the portion including the coating that is contacted with the optical disk. Non-limiting examples include metal, plastic, and elastomer. Examples of the metal include iron, SUS, aluminum, copper, and brass. Examples of the plastic include wholly aromatic polyester resin, epoxy resin, polycarbonate, polystyrene, ABS, polyethylene, polypropylene, polyacetal, cellulose, polyethylene terephthalate, polybutylene terephthalate, polyvinyl chloride, polyamide, polyphenylene oxide, polyurethane, and unsaturated polyester. Examples of the elastomer include hot curing rubber including natural rubber, chloroprene rubber, nitril rubber, ethylene propylene rubber, urethane rubber, fluoro rubber, silicone rubber and fluoro silicone rubber, and olefine based-, styrene based-, urethane based-, polyester based-, or polyamide based-thermoplastic elastomer.

The portion that is, or can be, contacted with the data reading surface of the optical disk is the disk tray 3 or the disk insertion 4.

Figure 3A:
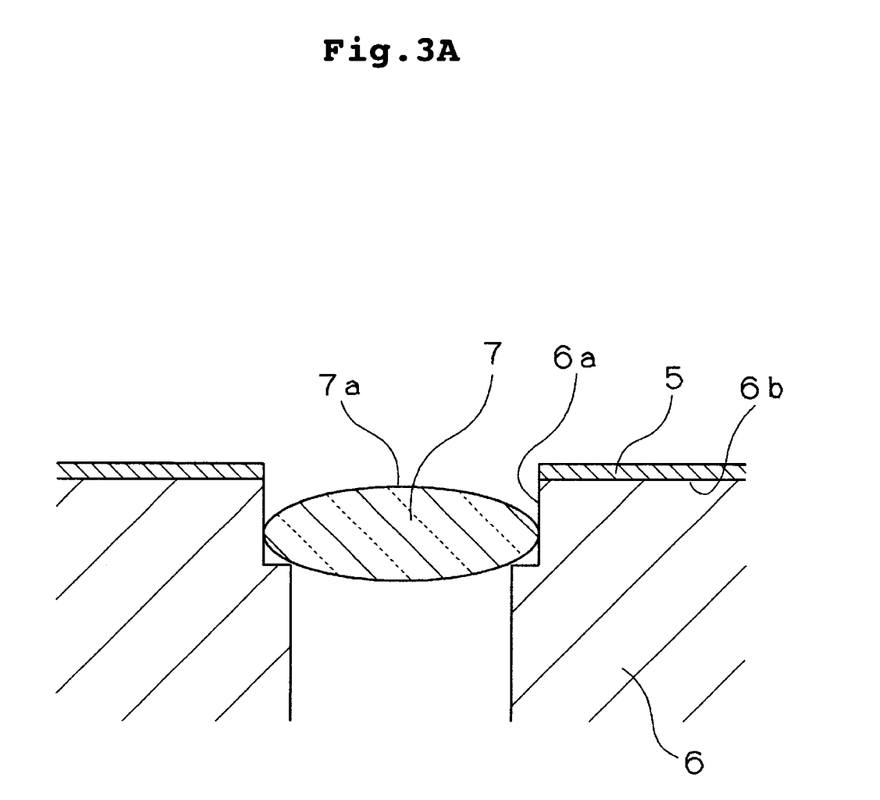
FIG. 3A is an enlarged sectional view of an objective lens part having a protecting film on the top surface of the lens holding member.
Figure 3B:
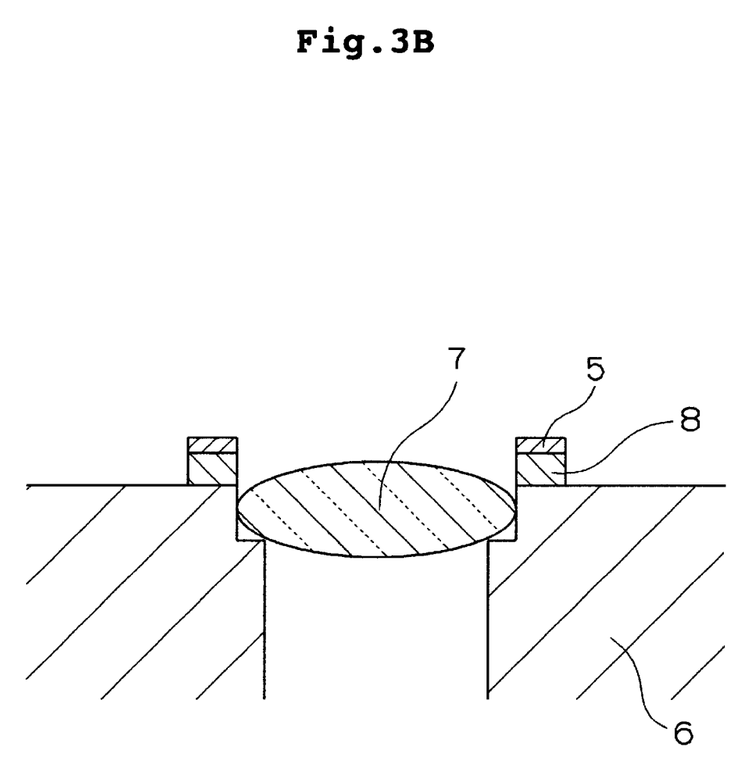
FIG. 3B is an enlarged sectional view of an objective lens part having a protecting film on a top of the lens protecting member.
Figure 3C:
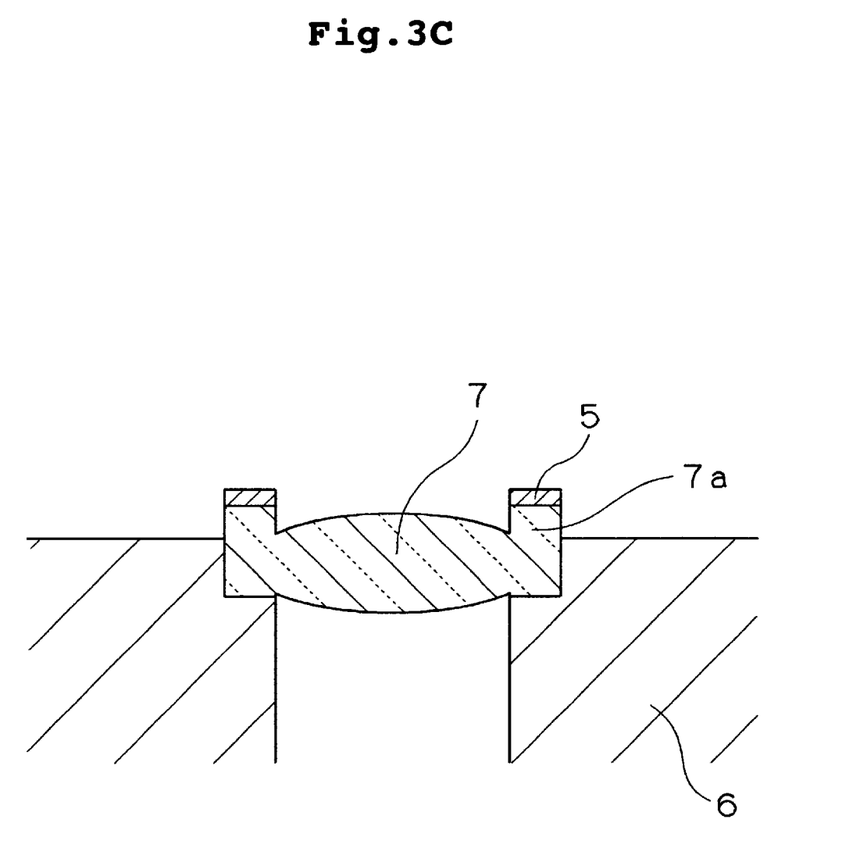
FIG. 3C is an enlarged sectional view of an objective lens part having a protecting film on a top of the lens protecting member.

The objective lens within the optical disk apparatus 1 can be contacted with the surface of the optical disk that rotates upon data reading. A protection member is disposed on the objective lens or on a holding member of the objective lens for protecting the surface of the optical disk. FIGS. 3A—3C are an enlarged sectional view of an objective lens parts.

As shown in FIG. 3A, the objective lens 7 is attached to a lens attaching portion 6a disposed on a lens holding member 6. A height of a top surface 6b of the lens holding member 6 is set to be greater than that of a lens surface 7a to prevent the lens surface 7a from directly contacting with the optical disk. In the present invention, the above-described scratch resistant coating film 5 is formed on the top surface 6b of the lens holding member 6.

As shown in FIG. 3B, a lens protecting member 8 may be formed on the lens holding member 6. In this case, the coating film 5 is formed on a top of the lens protecting member 8.

As shown in FIG. 3C, a lens surface protecting member 7a may be formed on the objective lens itself. In this case, the coating film 5 is formed on a top of the lens protecting member 7a.

The elastic coating film 5 has so excellent slidability that the data reading surface of the optical disk is not damaged, even if the data reading surface of the optical disk is directly contacted with the disk tray, the disk insertion, the objective lens or the objective lens holding member.

EXAMPLE 1

Polyester polyol and TDI were mixed at an equivalent ratio (hydroxyl group/isocyanate group) of 1.0 so that the resin had elongation at break after curing was 126%. 100 parts by weight of the mixture was dissolved in 100 parts by weight of methyl ethyl ketone and 100 parts by weight of butyl acetate. 40 parts by weight of polyurethane particles having a mean diameter of 15 to 25 µm manufactured by Dainippon Ink and Chemicals, Incorporated under the tradename of CFB100, and 20 parts by weight of fluororesin powder having a mean diameter of 4 µm manufactured by Sumitomo 3M Limited under the tradename of Dainion TF9207 were dispersed therein to provide a scratch resistant coating composition.

The coating composition was coated on a steel ball with a diameter of 5 mm so that a cured coating had a thickness of 40 to 50 µm, and cured at 80° C. for 60 minutes to produce a test piece for evaluation. The test piece was evaluated using a CD-R manufactured by Taiyo Yuden Co., Ltd. on a pin-on-disk type friction and abrasion tester in accordance with JIS K 7218.

Figure 4:
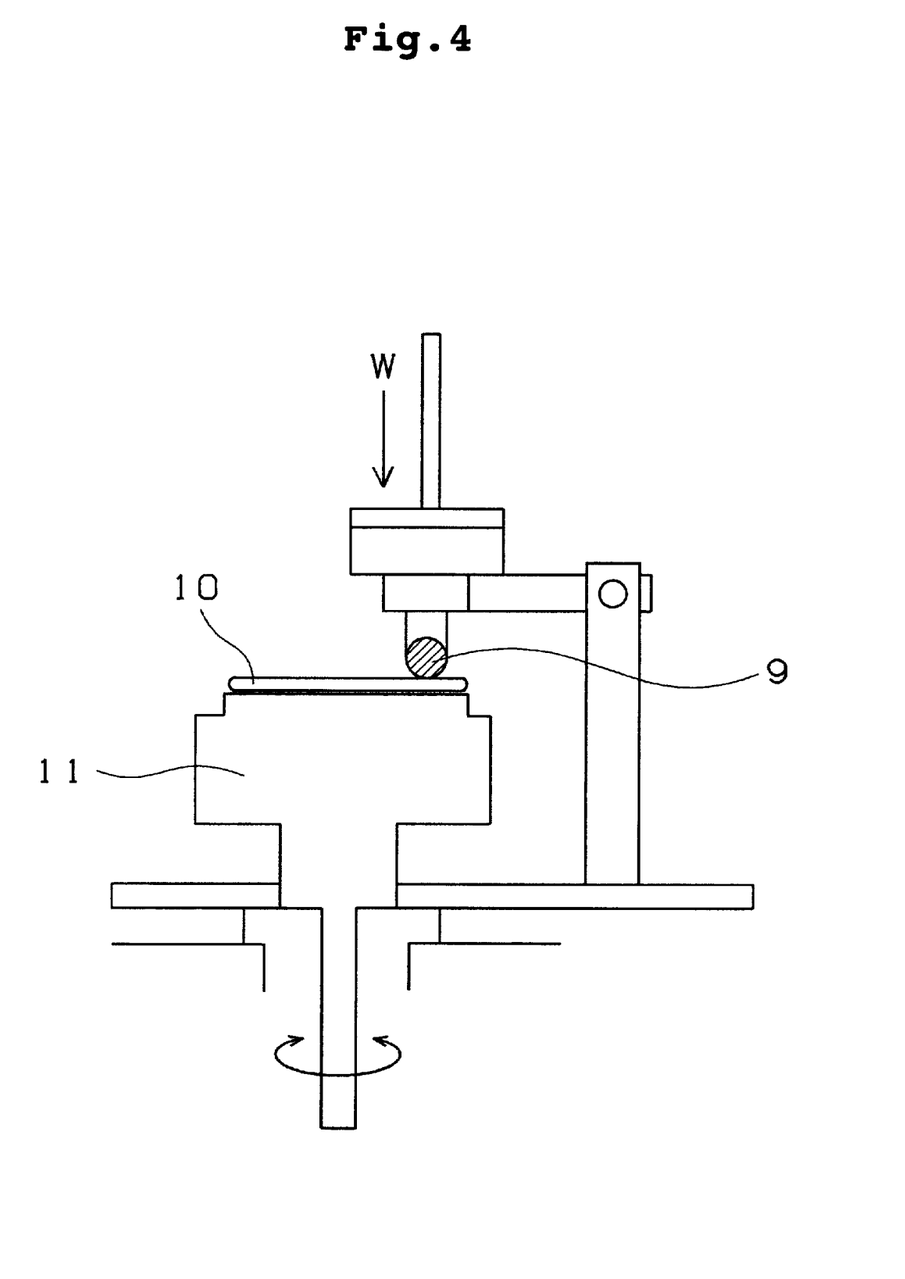
FIG. 4 is a schematic view of a pin-on-disk type friction and abrasion tester.

FIG. 4 is a schematic view of the pin-on-disk type friction and abrasion tester. In FIG. 4, 9 denotes the test piece, 10 denotes the CD-R as a counterpart of the test piece, and 11 denotes a rack. The test piece 9 was applied a load W, and contacted with a recording surface of the CD-R 10. The recording surface was abraded by rotating the rack 11 at a sliding speed of 7.2 m/min, a load of 0.2 N or 0.4 N and an operating time of 5 min. After the test, the scratch resistance of the recording surface on the CD-R 10 and the abrasion resistance of the coating were evaluated.

The scratch resistance of the recording surface was evaluated by observing the surface of the CD after the test with a microscope at magnification of 6 times to measure a scratch width. Evaluation standards are as follows:
Excellent: no scratches
Good: scratches with a width of less than 0.05 mm
Not good: scratches with a width of 0.05 mm or more and less than 0.2 mm
Bad: scratches with a width of 0.2 mm or more The abrasion resistance of the coating film was evaluated by observing the surface of the CD after the test with a microscope at magnification of 6 times to measure a diameter of an abraded part. Evaluation standards are as follows:
Excellent: no abrasion observed by the microscope
Good: no visible abrasion, but abrasion observed by the microscope
Not good: visible abrasion
Bad: a base was exposed The results of the scratch resistance of the recording surface on the CD-R are good at a load of 0.2 N and at 0.4 N respectively. The results of the abrasion resistance of the coating film are excellent at a load of 0.2 N and at 0.4 N respectively.

EXAMPLES 2 to 13

Scratch resistant coating compositions were prepared as in EXAMPLE 1 except that materials and mixing ratios shown in TABLE 1 were used. In EXAMPLE 13, block isocyanate was used and curing was conducted at 140° C. for 30 minutes. In TABLE 1, the materials are based on parts by weight.

The scratch resistant coating compositions were evaluated under the same conditions in EXAMPLE 1. The results are shown in TABLE 1.

TABLE 1

| | Example | | | | | | | | | | | |
|---|---|---|---|---|---|---|---|---|---|---|---|---|
| | 2 | 3 | 4 | 5 | 6 | 7 | 8 | 9 | 10 | 11 | 12 | 13 |
| Coating composition, parts by weight | | | | | | | | | | | | |
| Polyester polyol + TDI OH/NCO = 1.0 (126)*[1] | 100 | 100 | — | — | — | — | — | — | — | — | — | — |
| Polyester polyol + HDI OH/NCO = 1.0 (400)*[1] | — | — | 100 | 100 | — | — | — | — | — | — | — | — |
| Polyester polyol + TDI OH/NCO = 0.7 (210)*[1] | — | — | — | — | 100 | — | — | — | — | — | — | — |
| Polyester polyol + HDI (urethane adduct type) OH/NCO = 1.5 (280)* | — | — | — | — | — | 100 | — | — | — | — | — | — |
| Thermoplastic polyurethane resin (800)*[1] | — | — | — | — | — | — | 100 | 100 | — | — | — | — |
| (Acrylic polyol:PTMG = 8:2) + TDI OH/NCO = 1.0 (100)*[1] | — | — | — | — | — | — | — | — | 100 | — | — | — |
| (FEVE:PTMG = 8:2) + TDI OH/NCO = 1.0 (140)*[1] | — | — | — | — | — | — | — | — | — | 100 | — | — |
| Polyether polyol + TDI OH/NCO = 1.0 (380)*[1] | — | — | — | — | — | — | — | — | — | — | 100 | — |
| Polyester polyol/block isocyanate OH/NCO = 1.0 (280)*[1] | — | — | — | — | — | — | — | — | — | — | — | 100 |
| Urethane elastic particles (mean particle diameter 15 to 25 .m) | 100 | 20 | 50 | 150 | 60 | 120 | 20 | 50 | 30 | 20 | 50 | 100 |
| Polytetrafluoroethylene powder (mean particle diameter 4 .m) | 10 | 150 | 30 | 30 | 10 | 100 | 10 | 50 | 80 | 120 | 150 | 70 |
| Methyl ethyl ketone | 100 | 100 | 100 | 100 | 100 | 100 | 100 | 100 | 100 | 100 | 100 | 100 |

TABLE 1-continued

| | Example | | | | | | | | | | | |
|---|---|---|---|---|---|---|---|---|---|---|---|---|
| | 2 | 3 | 4 | 5 | 6 | 7 | 8 | 9 | 10 | 11 | 12 | 13 |
| Butyl acetate | 100 | 100 | 100 | 100 | 100 | 100 | 100 | 100 | 100 | 100 | 100 | 100 |
| Properties | | | | | | | | | | | | |
| Material of ball | steel | steel | steel | steel | steel | steel | steel | steel | steel | steel | steel | steel |
| Scratch resistance to CD-R (0.2 N/0.4 N)[*2] | E/G | E/G | E/E | E/E | G/G | E/E | E/G | E/E | G/N | G/G | E/E | E/E |
| Abrasion resistance of coating film (0.2 N/0.4 N)[*2] | E/G | E/G | E/E | G/G | E/G | G/G | G/N | G/G | E/G | E/G | G/G | G/G |

Note)
[*1]Materials Elongation at break (%)
[*2]E-Excellent, G-Good, N-Not good, B-Bad Comparative Examples 1 to 5

Coating films were formed on the test pieces 9 using a composition including no urethane particles (COMPARATIVE EXAMPLE 1) and a composition including no fluororesin powder (COMPARATIVE EXAMPLE 2), and were evaluated under the same conditions in EXAMPLE 1. A very high molecular weight polyethylene (Bearee UH5041 manufactured by NTN Engineering Plastics Corporation) ball with a diameter of 5 mm having no scratch resistant coating film (COMPARATIVE EXAMPLE 4) and a perfluoroalkyl resin (Bearee FE5000 manufactured by NTN Engineering Plastics Corporation) ball with a diameter of 5 mm having no scratch resistant coating film (COMPARATIVE EXAMPLE 5) were evaluated under the same conditions in EXAMPLE 1. The results are shown in TABLE 2. In TABLE 2, the materials are based on parts by weight.

fluororesin powder, whereby the recording surface is not damaged by a collision or friction to the optical disk. The contact member is especially useful to the DVD or the optical disk apparatus using the helium neon laser that the damaged recording surface of the optical disk or the damaged objective lens may adversely affect reading properties of the optical disk than ever before.

The protective, i.e., scratch resistant coating film of the optical disk according to the present invention has extremely low elastic deformation. The coating film is formed on the objective lens or the holding member of the objective lens, thereby effectively preventing interference between the objective lens and the optical disk. As a result, the objective lens is prevented from damaging. In this case, the recording surface of the optical disk can also be prevented from damaging.

The protective, i.e., scratch resistant coating composition according to the present invention comprises the urethane

TABLE 2

| | Comparative Example | | | | |
|---|---|---|---|---|---|
| | 1 | 2 | 3 | 4 | 5 |
| Coating composition, parts by weight | | | | | |
| Polyester polyol + HDI OH/NCO = 1.0 (400)[*1] | 100 | — | — | — | — |
| Thermoplastic polyurethane resin (800)[*1] | — | 100 | — | — | — |
| Urethane elastic particles (mean particle diameter 15 to 25 .m) | — | 100 | — | — | — |
| Polytetrafluoroethylene powder (mean particle diameter 4 .m) | 100 | — | — | — | — |
| Methyl ethyl ketone | 100 | 100 | — | — | — |
| Butyl acetate | 100 | 100 | — | — | — |
| Properties | | | | | |
| Material of ball | steel | steel | steel | PE | PFA |
| Scratch resistance to CD-R (0.2 N/0.4 N)[*2] | N/B | N/B | B/B | B/B | B/B |
| Abrasion resistance of coating film (0.2 N/0.4 N)[*2] | B/B | N/B | — | — | — |

Note)
[*1]Materials Elongation at break (%)
[*2]E-Excellent, G-Good, N-Not good, B-Bad As shown in TABLE 1, each EXAMPLE provided excellent scratch resistance to the recording surface of the CD-R, and abrasion resistance to the coating film. On the other hand, as shown in TABLE 2, COMPARATIVE EXAMPLE 1 or 2 excluding the urethane particles or the fluororesin powder, and COMPARATIVE EXAMPLES 3 to 5 including no coating provided poor scratch resistance to the recording surface of the CD-R, and abrasion resistance to the coating film.

The contact member according to the present invention comprises a portion that is, or can be, contacted with the optical disk has the coating containing the urethane resin as the base, and at least the polyurethane particles, and the resin as the component for forming the coating film, and at least the polyurethane particles and the fluororesin powder, thereby effectively preventing the recording surface of the optical disk from damaging. It is possible to form the coating film easily on the surface of the disk tray or the disk insertion, the objective lens and the holding member of the objective lens.

What is claimed is:

1. A contact member that is, or can be, contacted with an optical disk in an optical disk apparatus, comprising:
    a portion that is, or can be, contacted with the optical disk, and
    a coating formed on a surface of the portion, wherein the coating comprises a urethane resin as a base, and at least polyurethane particles, and fluororesin powder.

2. A contact member to the optical disk as claimed in claim 1, wherein the portion that is, or can be, contacted with the optical disk is a portion that is directly contacted with a data reading surface of the optical disk.

3. A contact member to the optical disk as claimed in claim 2, wherein the portion that is directly contacted with the data reading surface of the optical disk is at least one selected from a disk tray, a disk insertion, an objective lens and a holding member of the objective lens.

4. A contact member to the optical disk as claimed in claim 1, wherein the portion that is, or can be, contacted with the optical disk is a portion that can be contacted with a data reading surface of the optical disk.

5. A contact member to the optical disk as claimed in claim 4, wherein the portion that can be contacted with the data reading surface of the optical disk is at least one selected from a disk tray, a disk insertion, an objective lens and a holding member of the objective lens.

6. A contact member to the optical disk as claimed in claim 1, wherein the urethane resin is produced by reacting a polyol with a polyisocyanate.

7. A contact member to the optical disk as claimed in claim 6, wherein the polyol is a polyester polyol.

8. A contact member to the optical disk as claimed in claim 6, wherein the polyol is an acrylic polyol.

9. A contact member to the optical disk as claimed in claim 6, wherein the polyol is a polyether polyol.

10. A contact member to the optical disk as claimed in claim 6, wherein the polyisocyanate is a block isocyanate.

11. A contact member to the optical disk as claimed in claim 6, wherein a mixed equivalent ratio of a hydroxyl group of the polyol to an isocyanate group of the polyisocyanate is 0.5 to 2.0.

12. A contact member to the optical disk as claimed in claim 1, wherein the urethane resin is a thermoplastic urethane resin.

13. A contact member to the optical disk as claimed in claim 1, wherein the polyurethane particles are elastic particles of a polyurethane resin.

14. A contact member to the optical disk as claimed in claim 1, wherein the fluororesin powder is at least one selected from the group consisting of polytetrafluoroethylene, tetrafluoroethylene-perfluoroalkylvinylether copolymer, tetrafluoroethylene-hexafluoropropylene copolymer, ethylene-tetrafluoroethylene copolymer, tetrafluoroethylene-fluoroalkylvinylether-fluoroolefin copolymer, polychlorotrifluoroethylene, ethylene-chlorotrifluoroethylene copolymer, polyvinylidene fluoride, and polyvinyl fluoride.

15. A contact member to the optical disk as claimed in claim 14, wherein the fluororesin is polytetrafluoroethylene.

16. A contact member to the optical disk as claimed in claim 1, wherein 20 to 15 parts by weight of the polyurethane particles and 10 to 150 parts by weight of the fluororesin powder are blended based on 100 parts by weight of the urethane resin.

17. A protecting film for an optical disk formed on a portion that is, or can be, contacted with the optical disk in an optical disk apparatus to protect the optical disk from damaging, comprising:

a urethane resin base, polyurethane particles, and fluororesin powder.

18. A coating composition for an optical disk formed on a portion that is, or can be, contacted with the optical disk in an optical disk apparatus to protect the optical disk from damaging, comprising:

a urethane resin base, polyurethane particles, and fluororesin powder.

* * * * *